(12) United States Patent
Janssen et al.

(10) Patent No.: US 8,789,273 B2
(45) Date of Patent: Jul. 29, 2014

(54) PISTON FOR INTERNAL COMBUSTION ENGINES, PRODUCED BY MEANS OF A MULTI-ORBITAL FRICTION WELDING METHOD

(75) Inventors: Michael Albert Janssen, Mosbach (DE); Gerhard Luz, Nordheim (DE); Volker Gniesmer, Alfed (DE); Steffen Stork, Sersheim (DE); Martin Weissert, Nordheim (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 770 days.

(21) Appl. No.: 12/919,930

(22) PCT Filed: Jan. 30, 2009

(86) PCT No.: PCT/EP2009/000627
§ 371 (c)(1),
(2), (4) Date: Dec. 6, 2010

(87) PCT Pub. No.: WO2009/106200
PCT Pub. Date: Sep. 3, 2009

(65) Prior Publication Data
US 2011/0119914 A1  May 26, 2011

(30) Foreign Application Priority Data
Feb. 29, 2008 (GB) .................... 10 2008 011 922

(51) Int. Cl.
*B23P 15/10* (2006.01)
(52) U.S. Cl.
USPC .............. 29/888.04; 29/888.042; 29/888.044; 228/112.1

(58) Field of Classification Search
USPC ................. 29/888.04, 888.042, 888.044; 228/112.1
See application file for complete search history.

(56) References Cited

U.S. PATENT DOCUMENTS

| | | | | |
|---|---|---|---|---|
| 4,811,887 A | * | 3/1989 | King et al. ................... | 228/2.3 |
| 5,359,922 A | * | 11/1994 | Martins Leites et al. ....... | 92/189 |
| 5,518,562 A | * | 5/1996 | Searle et al. ................. | 156/73.5 |
| 5,697,545 A | * | 12/1997 | Jennings et al. ........... | 228/112.1 |

(Continued)

FOREIGN PATENT DOCUMENTS

| | | |
|---|---|---|
| DE | 2919638 A1 | 11/1980 |
| DE | 3719703 A1 | 12/1988 |

(Continued)

OTHER PUBLICATIONS

Written Opinion of the International Searching Authority for PCT/EP2005/010535 Dated Jan. 2004.

(Continued)

*Primary Examiner* — Lee D Wilson
*Assistant Examiner* — Ruth G Hidalgo-Hernande
(74) *Attorney, Agent, or Firm* — Young Basile Hanlon & MacFarlane P.C.

(57) ABSTRACT

A method for producing a piston of an internal combustion engine, designed as a one-piece cooling channel piston. The piston includes an upper part and a lower part supported by corresponding circumferential joining bosses together forming a joining zone. In order to produce a bonded joint of the upper part and the lower part, the joining bosses are connected by means of multiorbital friction welding in the region of a rotationally symmetrical or rotationally asymmetrical joining zone.

7 Claims, 7 Drawing Sheets

(56) References Cited

U.S. PATENT DOCUMENTS

| | | | |
|---|---|---|---|
| 5,934,174 A * | 8/1999 | Abraham et al. | 92/222 |
| 6,155,157 A * | 12/2000 | Jarrett | 92/186 |
| 6,279,455 B1 * | 8/2001 | Kruse | 92/186 |
| 6,450,395 B1 * | 9/2002 | Weeks et al. | 228/112.1 |
| 6,477,941 B1 * | 11/2002 | Zhu et al. | 92/186 |
| 6,698,391 B1 | 3/2004 | Kemnitz | |
| 2001/0029840 A1 * | 10/2001 | Gaiser et al. | 92/186 |
| 2004/0094604 A1 * | 5/2004 | Halley et al. | 228/112.1 |
| 2004/0144247 A1 * | 7/2004 | Zhu et al. | 92/216 |
| 2006/0157538 A1 * | 7/2006 | Crasser | 228/113 |

FOREIGN PATENT DOCUMENTS

| | | |
|---|---|---|
| DE | 4134528 C2 | 5/1992 |
| DE | 29905633 U1 | 9/2000 |
| DE | 10244512 A1 | 4/2004 |
| DE | 102001038464 A1 | 2/2006 |
| DE | 102004061778 A1 | 4/2006 |
| EP | 0019323 A | 11/1980 |
| EP | 1061249 A2 | 12/2000 |
| JP | 63002576 A | 1/1988 |
| WO | WO0004286 A | 1/2000 |
| WO | WO2007031109 A | 3/2007 |

OTHER PUBLICATIONS

International Preliminary Report on Patentability for PCT/EP2005/010535 Dated Apr. 2005.

International Search Report International application No. PCT/EP2009/000627 dated May 28, 2009.

* cited by examiner

PISTON FOR INTERNAL COMBUSTION ENGINES, PRODUCED BY MEANS OF A MULTI-ORBITAL FRICTION WELDING METHOD

BACKGROUND

The invention relates to a method for producing a piston of an internal combustion engine that is designed as a finished, one-piece cooling channel piston with an upper part and a lower part supported by matching joining bosses that together form a joining zone and that are materially bonded by means of friction welding.

Friction welding is based on the principle by which sliding friction is generated between two components through relative movement and simultaneous pressure to create the required welding energy at the surfaces to be welded in the area of a joining zone. In known rotational friction welding machines, a motor-driven chuck and an upsetting device are used to provide the kinetic energy during the entire welding cycle. For friction welding, two work pieces are rubbed together under pressure and plasticized through the resulting frictional heat. Preferably the work piece installed in the driven chuck is rotated relative to the second work piece held stationary in the upsetting device. As soon as the temperature required for welding is reached, the upsetting device presses the two work pieces together. Disadvantageously, this method requires that one of the two components rotates at a high speed to provide the necessary energy.

A cooling channel piston is known from DE 10 2004 061 778 A1 consisting of an upper part and a lower part that are supported by way of matching joining bosses, both running rotationally symmetrically and spaced apart radially. A material bond is created between the inner joining bosses by means of friction welding in the area of a joining zone. The radially outer joining bosses are subsequently joined by means of a separate weld, where no provision is made for friction welding.

U.S. Pat. No. 6,155,157 shows a cooling channel piston with two components that can be produced separately and which are subsequently joined by a known friction welding procedure to form a material bond to create a one-piece cooling channel piston. This construction makes relatively simple piston production practicable, but in which the known piston concept regarding latitude in geometry, in particular in the design of joining bosses, is severely restricted.

Starting from the prior art, it would be desirable to improve the geometric design potential of pistons by means of an optimized joining technique for the purpose of achieving flexible piston production and a reduction in weight.

SUMMARY

The invention relates to a production method for a piston with joining bosses running rotationally symmetrically or rotationally asymmetrically in the lower part and the upper part that are materially bonded in the area of a joining zone by means of a multi-orbital friction welding procedure.

In multi-orbital friction welding, the individual piston components are firmly clamped on both sides proximate the joining bosses in friction welding heads and thereby pressed against each other before the joining bosses are set oscillating with the aid of the friction welding heads. The two parts of the joint are advantageously moved in the same rotational direction with a preferred phase offset of 180° in extremely small circular orbital movements resembling the motion of an orbital sander to generate frictional heat and they specifically oscillate in phase opposition. As a result of this controlled motion, frictional energy is introduced simultaneously at several locations, whereby the previous limits of the friction welding system are expanded. In the multi-orbital friction welding method, the components to be joined are rubbed against each other over the entire joining zone, which results in a desirable even and rapid heating of the entire welding surface. As a result, optimal, homogenous energy input takes place at each point of the joining zone formed by the piston joining bosses. This energy input is in contrast to an exclusively rotating motion of one half of the joint in known friction welding methods that, with regard to the joining zone, causes inhomogeneous energy input because of a lack of internal speed. Using the friction welding method described herein, welding times can be advantageously further shortened and follow-up processes reduced. In addition, maximum joining quality can be achieved, and the achievable strength values are close to the material characteristics of the two parts of the joint. The method is furthermore independent of the work piece shape, the material mass, and the symmetry of the welding surface or the joining zone since the specific welding pressure is always constant with reference to the welding surface. Since the materials are joined in a plastic state in multi-orbital friction welding, the temperature level is considerably below the melting temperatures of conventional friction welding methods. The machine system stops when the joining temperature is reached to join both work pieces under pressure with a precise final dimension.

The application of the multi-orbital friction welding method simplifies the production of the piston because of a great latitude in design with respect to the location, the alignment and wall thickness of the joining bosses, and the resulting joining zone. Since the deflection of the piston components to be joined under friction is low at approx. 0.3 to 1.2 mm, thin-walled joining bosses can also be welded. The application of the multi-orbital friction welding method makes flexible, time-optimized production possible and thus reduced costs in the production of the piston. In an advantageous manner, the economy of piston production can be considerably increased through shortened process times.

The novel production method advantageously makes practicable an improved design for the piston components since each component can be conceived as a part in itself with respect to its geometry to achieve optimal durability, without taking into account the technique used to achieve the material bond. There exists an advantageous opportunity to design the joining bosses solely with regard to optimized stiffness or rigidity and a weight-optimized piston. Furthermore, design features can be realized through the welding method that could not be implemented previously because of the required rotationally symmetrical geometry of the joining zones in friction welds. At the same time, the invention presents a solution with which constantly increasing requirements regarding thermal and mechanical stress on pistons and the requirement for reducing the weight of rotating and oscillating components in internal combustion engines can be met.

The invention also relates to a production method for pistons that comprises at least two joining zones spaced radially apart from one another, which are joined by means of a multi-orbital friction weld. Because of the extremely small circular movements of all the parts forming the joint, an advantageously synchronous, simultaneous joining of several joining bosses is possible, even if the bosses are spaced relatively closely together. For example, the multi-orbital friction welding method can be used to produce a cooling channel piston in which the cooling channel extends between the lower part and the upper part bounded on both sides by joining bosses.

The application of the multi-orbital friction welding method to piston production makes dimensioning of the joining bosses practicable in a way adapted to the strength requirements of individual areas of the piston. Since this method is not required to be rotationally symmetrical, the joining bosses can have a constant or fluctuating wall thickness around their circumference to create variable cross-sections. Dimensioning of the joining bosses can thus be advantageously adapted to the thermal and mechanical stresses that arise, but diverge from each other in the individual areas of the piston, which additionally confers a weight benefit.

The multi-orbital friction welding method additionally allows a vertical offset in the joining zone, whereby the friction welding method can be adapted, for example, to specified geometric or special design concepts for the piston. Underscoring the variety of designs, it is further possible in pistons with two joining zones spaced radially apart from each other to locate the zones one under the other, such that the individual joining zones have both a different, rotationally asymmetrical shape and a vertical offset.

The friction welding method does not require a closed joining zone but permits a recess in the joining zone, which can be described locally as a passage that can be used for coolant transfer between two cooling channels. This recess can represent an accommodation of the joining boss to the stresses arising in an operating state, which simultaneously allows the weight of the piston to be reduced. In order to satisfy local strength requirements for the piston, the welding method makes it possible, on the other hand, to provide the joining bosses partially with radially inwardly and/or radially outwardly facing stiffening ribs that extend into the area of the joining zones and are materially bonded.

The joining zones that are rotationally symmetrical, rotationally asymmetrical or run in part approximately parallel to a piston axis are disposed such that the zones are aligned perpendicular to a longitudinal piston axis. As an alternative to this, a location or disposition of the joining zone or of the joining zones offset to each other is possible that diverges from a perpendicular pressure direction of the multi-orbital friction weld. The layout further makes it possible that the upsetting axes in the friction weld are aligned orthogonally or non-orthogonally to each other.

Multi-orbital friction welding advantageously causes no, or only minor, weld beads that remain in the joining zone after the weld is completed or have to be removed as needed by reworking.

In an aspect of the invention, the cooling channel is sealed during the friction welding process. Subsequently, by means of mechanical machining as required, at least one local opening can be introduced into the joining boss to permit, for example, coolant entry into the cooling channel. With pistons that include a combination of several cooling channels separated by joining bosses, there exists the potential of providing the joining boss with at least one passage to be designated as a transfer opening that ensures an exchange of coolant between the cooling channels.

In a further aspect of the invention, a ring gap provided in the area of the piston outer contour is closed by means of an additional or covering member. The covering member, which encloses a passage or transfer opening, for example, can be attached to the lower part or to the upper part of the piston using a positive or interference fit or be affixed at the same time using multi-orbital friction welding in a material bond.

The invention makes it practicable in an advantageous manner to materially bond piston components made from a matching material or from different materials through multi-orbital friction welding. For example, a piston component made from a lightweight material containing the primary alloying element aluminum can be joined to another piston component of steel or an iron material, e.g., gray iron. Consideration can additionally be given to producing the upper part and the lower part using the same or different methods, for example, forging, pressing, casting, extruding and similar.

BRIEF DESCRIPTION OF THE DRAWING

The following description explains various of the invention shown in FIGS. 1 to 7, in which.

DETAILED DESCRIPTION

Figure 1:
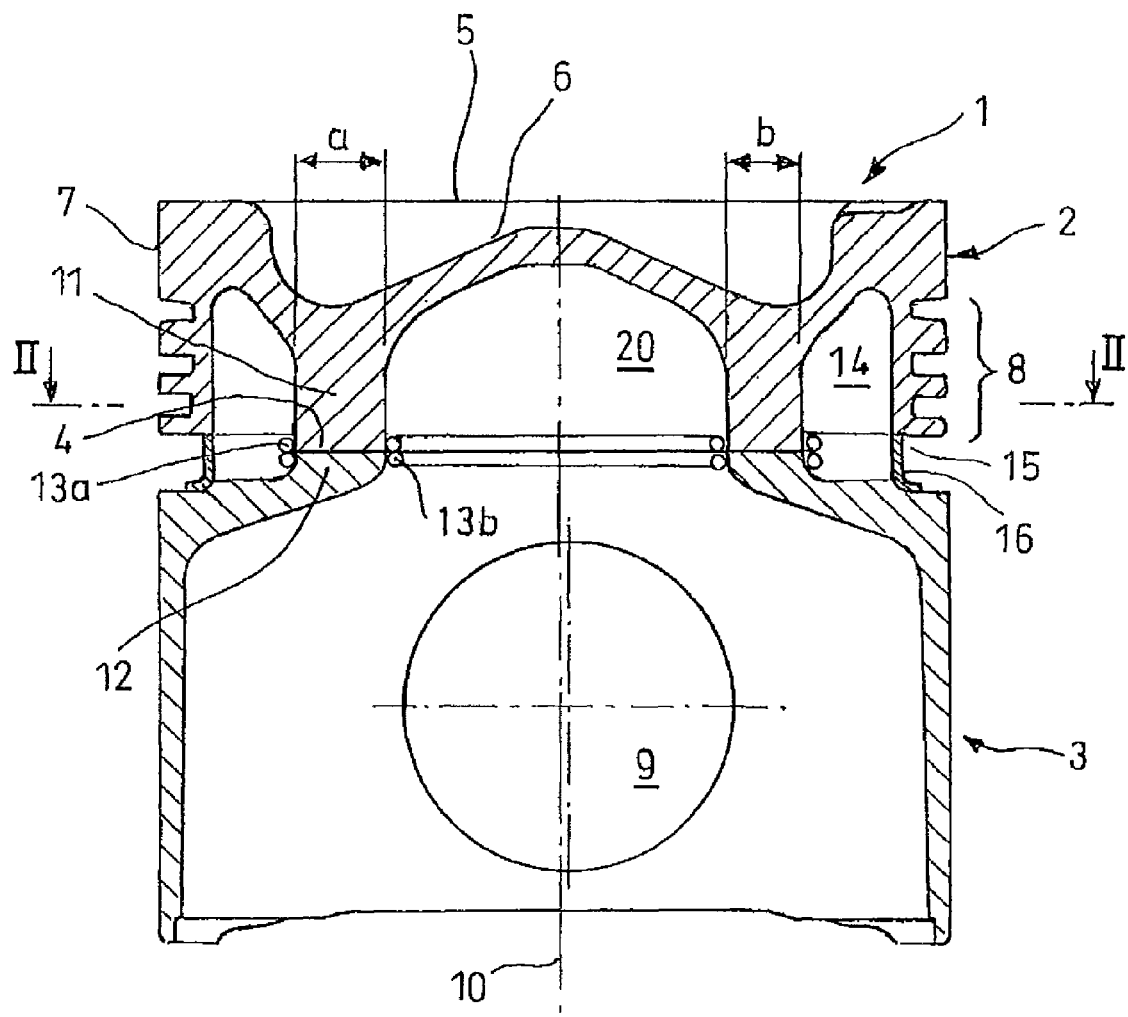
FIG. 1 is a first aspect of a cooling channel piston in a longitudinal section.

FIG. 1 shows a one-piece piston 1 in longitudinal section in which an upper part 2 and a lower part 3 are materially bonded via a joining zone 4, which can also be described as a joining surface, to form a physical unit. A piston crown 5 of the upper part 2 encompasses a combustion bowl 6 that around the circumference becomes a top land 7 which adjoins a ring belt 8 for positioning piston rings, not shown in FIG. 1. The lower part 3 forms a piston skirt in which two diametrically oppositely located piston-pin bores 9 are incorporated. In the area of the joining zone 4, correspondingly arranged joining bosses 11, 12 abut each other, assigned to the upper part 2 and the lower part 3, respectively. Multi-orbital friction welding is used to produce a bonded joint in which the joining bosses 11, 12 and the associated components, upper part 2 and lower part 3, rotate in the same direction in extremely small circular orbital movements in a preferred phase offset of 180°. Frictional heat is generated through this motion which results in homogenous heat entry at each point of the joining zone 4. This special friction welding that forms small weld beads 13a, 13b does not require a rotationally symmetrical layout or geometry of the joining zone 4 to a piston axis 10. The joining bosses 11, 12 on the inside and the ring belt 8 on the outside bound a cooling channel 14 integrated into the piston 1. A ring gap 15 resulting between the ring belt 8 and the lower part 3 is closed by a separate additional member 16 that is secured in position to the lower part 3 by means of a weld or, alternatively, by a positive-fit and/or interference-fit connection.

Figure 2:
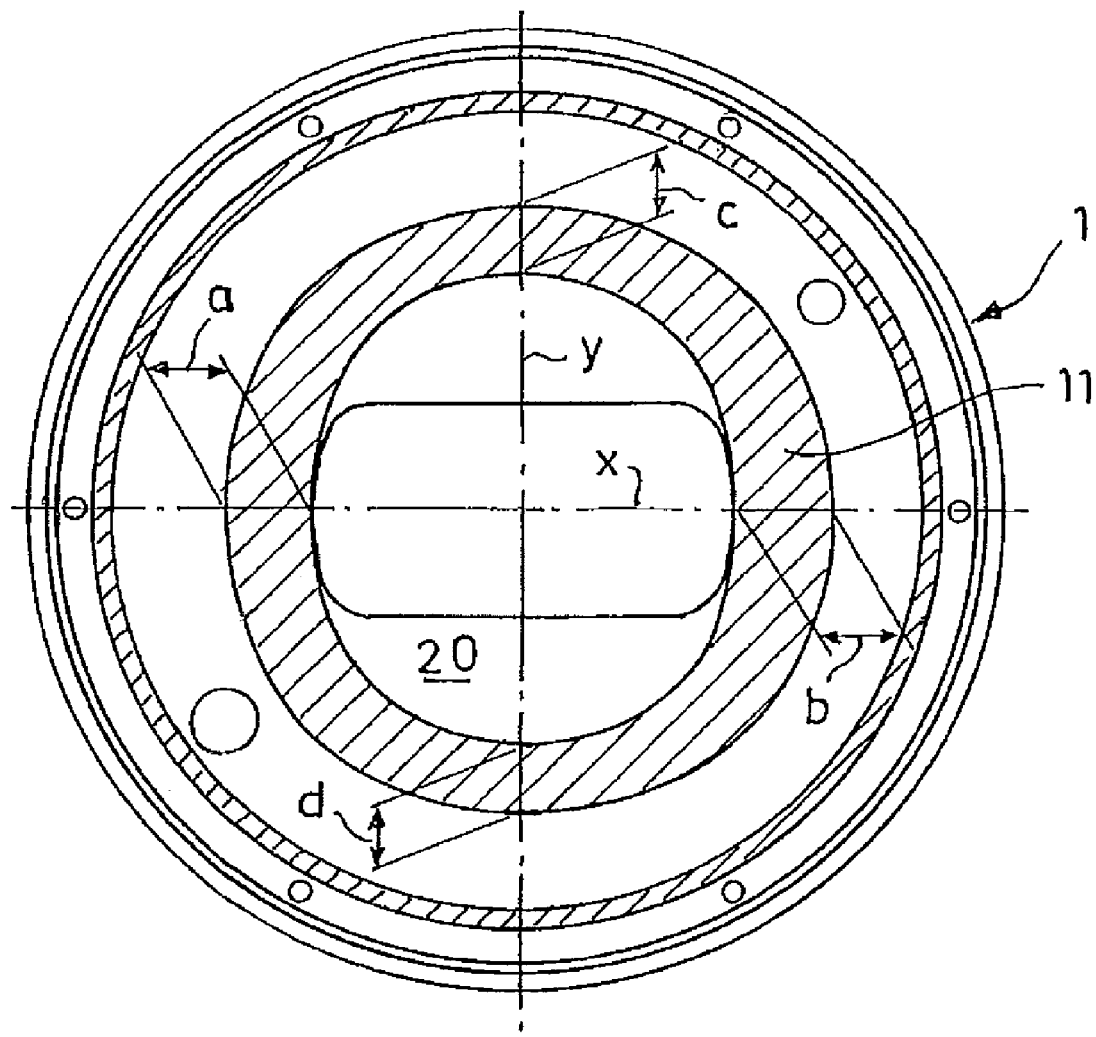
FIG. 2 is a section view of the piston from FIG. 1.

FIG. 2, which shows the piston 1 in a section view along the plane 2-2 in FIG. 1, clarifies specifically the position of joining boss 11 that simultaneously defines the surface or the cross-section of the joining zone 4. The progression of joining boss 11 shows sections "a" and "b" running almost parallel in areas to the axis "y" of the piston 1, with adjoining sections "c" and "d" which are disposed as far as possible concentric to the piston center point. Underlining the variety of shapes, the wall thicknesses of the joining boss 11 can be dimensioned differently in the individual sections, matched to the respective piston loads arising during operation. One possibility is to design wall thicknesses for sections "a" and "b" identically or differently and to make the additional sections "c" and "d" of the joining boss 11 in turn identical to or different from section "a" and/or section "b".

Figure 3:
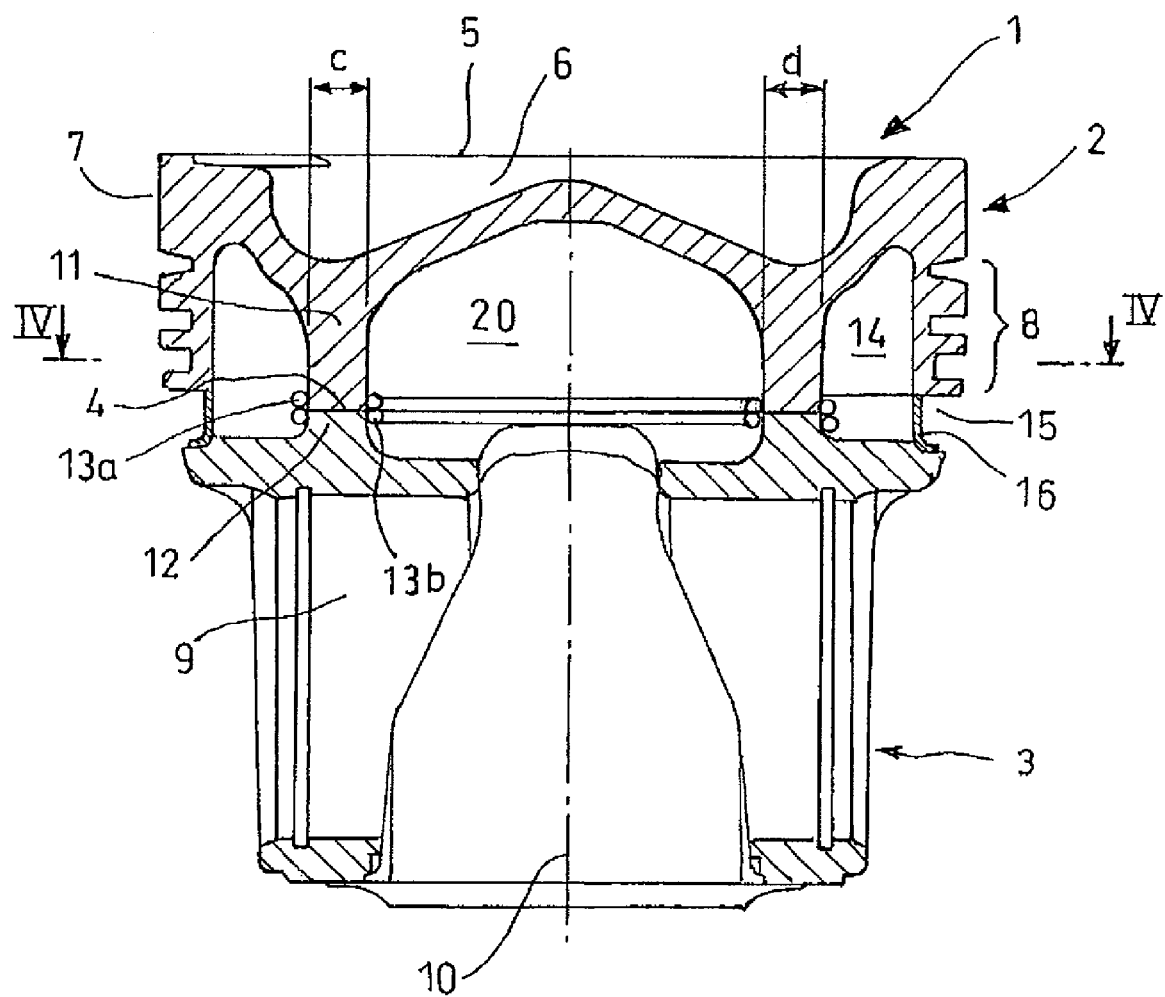
FIG. 3 shows the piston from FIG. 1 in a longitudinal section rotated about 90°.

FIG. 3 shows the piston 1 in a longitudinal section rotated by 90° from FIG. 1 and clarifies the shape and the progression of the joining bosses 11, 12 in sections "c" and "d", with a reduced wall thickness compared with sections "a" and "b" shown in FIG. 1.

Figure 4:
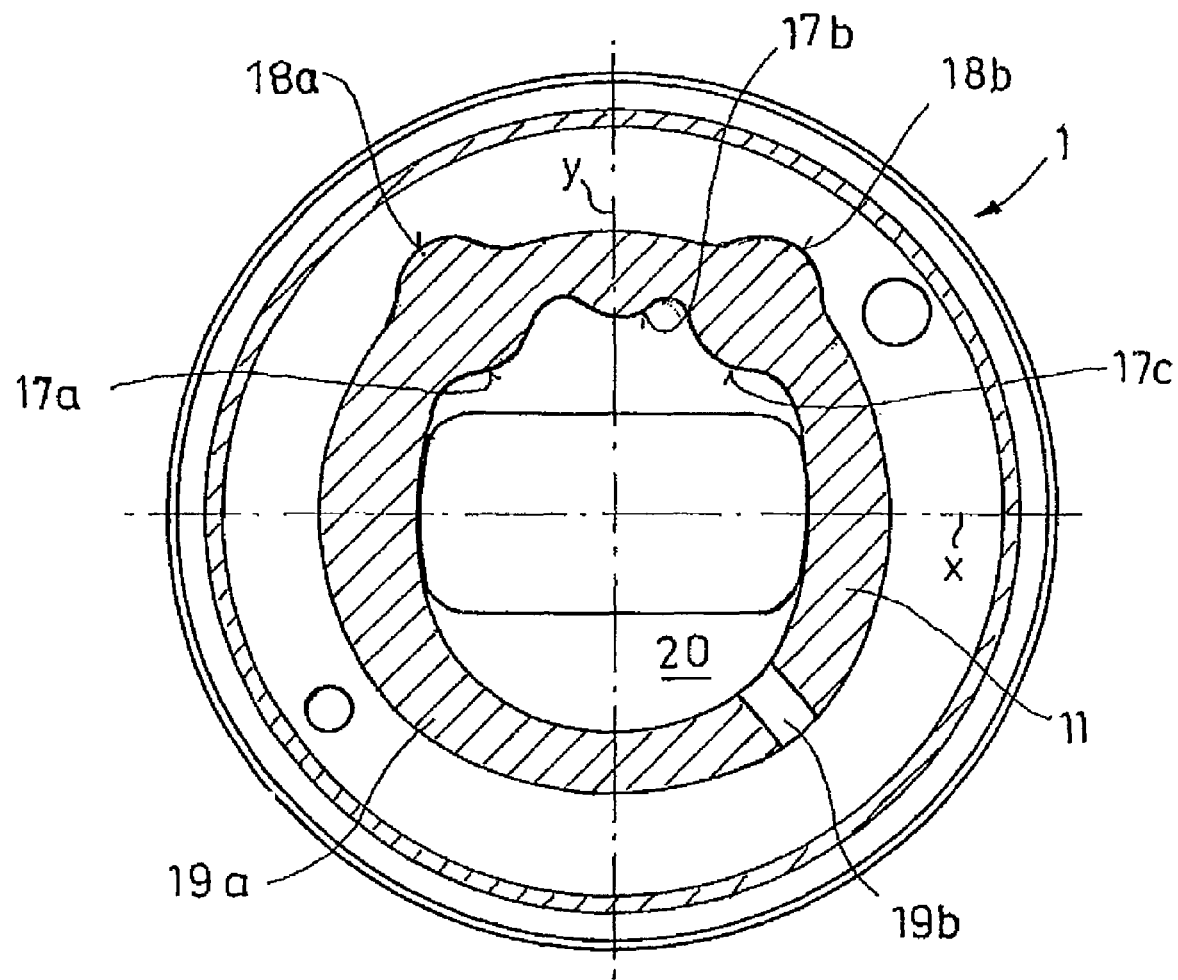
FIG. 4 show a section view of the piston from FIG. 3.

The piston 1 is depicted in FIG. 4 in a section view in accordance with the plane IV-IV from FIG. 3 and shows a progression for the joining boss 11 differing from FIG. 2. In a section running approximately parallel to the axis "'x" of the piston 1, the joining boss 11 encompasses stiffening ribs 17a, 17b, 17c directed radially inward and disposed offset to each other, matched in part by additional stiffening ribs 18a, 18b directed radially outward. On the side lying opposite to the stiffening ribs, passages 19a, 19b, offset to each other, are formed in the joining boss 11 through which, for example, a coolant exchange can take place from the cooling channel 14 into the interior area 20.

Figure 5:
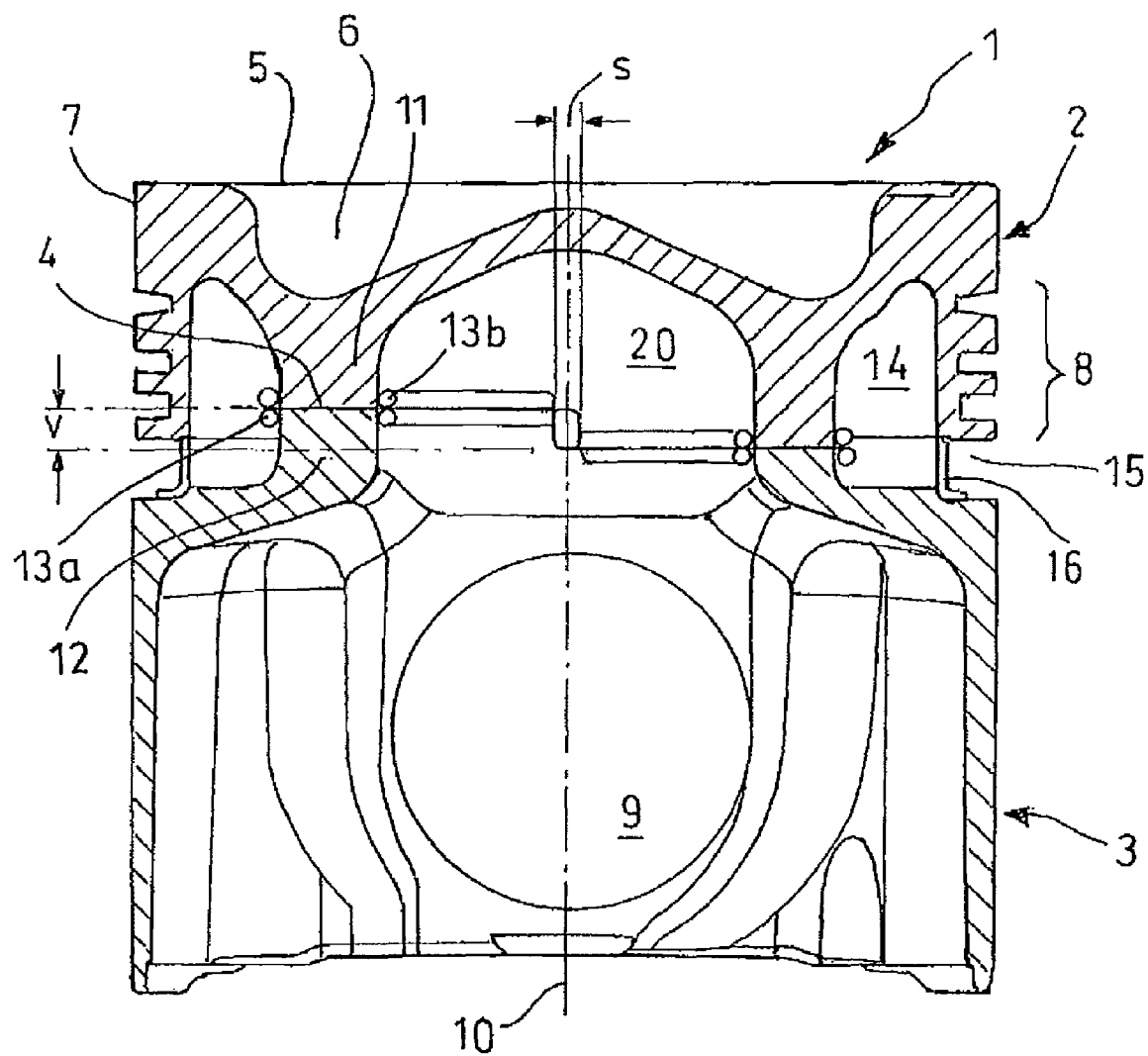
FIG. 5 shows the piston from FIG. 1, with the joining zone having a vertical offset.

The piston 1 shown in FIG. 5 is to a very large extent comparable to the piston 1 shown in FIG. 1. Consequently, matching components are given the same reference numerals. In contrast to FIG. 1, the joining zone 4 in accordance with FIG. 5 forms a vertical offset "v" that is made possible by the multi-orbital friction welding method. An open space "s" is required to implement the orbital welding motion.

Figure 6:
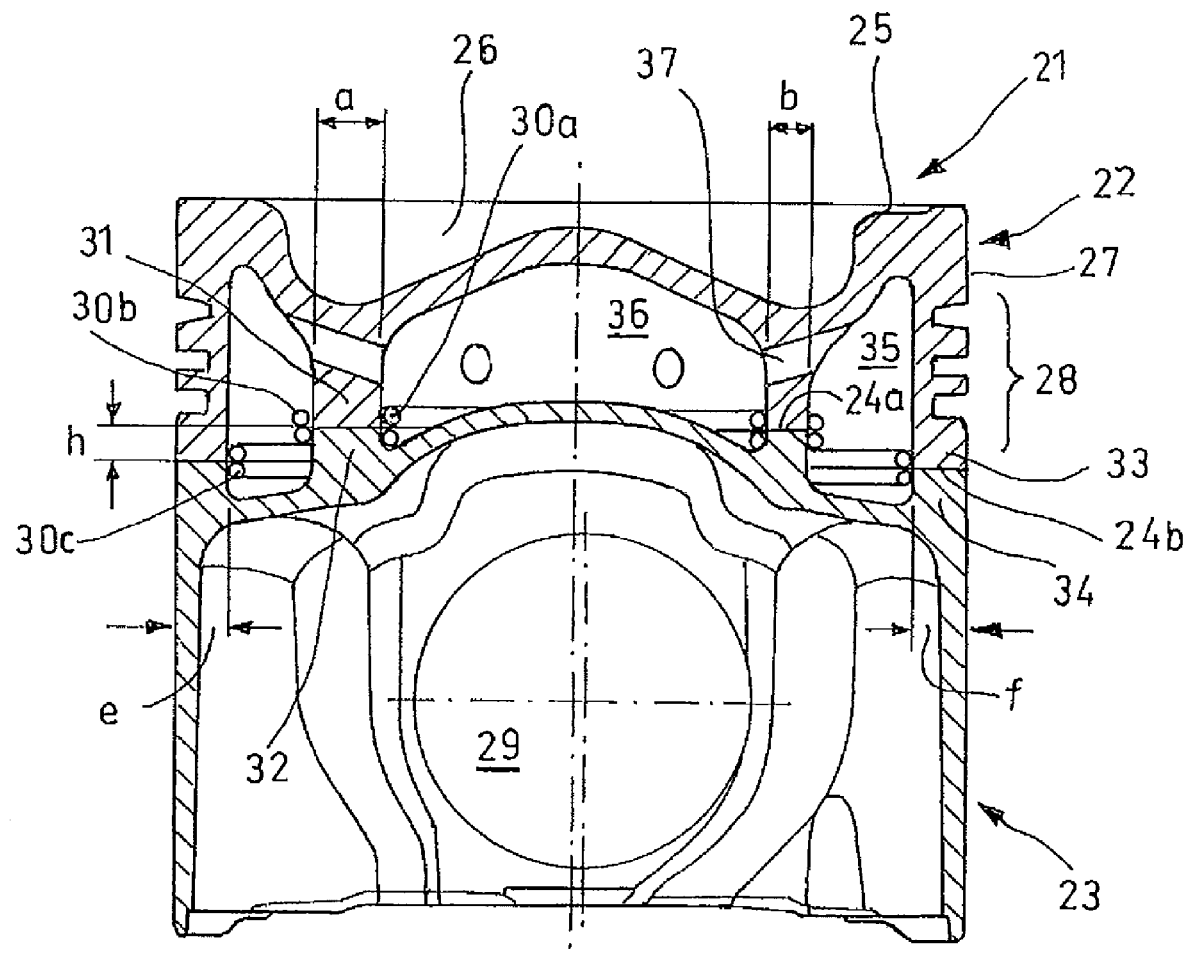
FIG. 6 shows a second aspect of a cooling channel piston in a longitudinal section.

The piston 21 in accordance with FIG. 6 is comparable in part with the piston shown in FIG. 1, so matching components have identical reference numerals. The upper part 22 forming a piston crown with integral combustion bowl 26 and a top land 27 on outside and the lower part 23 enclosing a piston-pin bore 29 are supported by two pairs of radially offset joining bosses. The radially inner joining bosses 31, 32 form joining zone 24a and the radially outer joining bosses 33, 34 form joining zone 24b. The joining bosses 31, 32, 33, 34 are materially joined by means of multi-orbital friction welding in joining zones 24a, 24b, whereby small weld beads 30a, 30b, 30c form on the outside in each case at joining zones 24a, 24b. Underscoring the variety of layouts, the design of the joining bosses 31, 32, or 33, 34, includes diverging or identical wall thicknesses in oppositely located sections "a" "b", or "e" "f", respectively. Furthermore, the wall thickness can be designed differently between the radially spaced apart pairs of joining bosses. Joining zones 24a, 24b are vertically offset "h" to each other, wherein joining zone 24b is located at a greater distance from the piston crown 25 than joining zone 24a. Two cooling channels 35, 36 are integrated into the piston 21, bounded by joining bosses. The outer cooling channel 35, which is of circular configuration, is bounded on the outside by the ring zone 28, or joining bosses 34, 35 and on the inside by joining bosses 31, 32. The center cooling channel 36 extends largely over the area of the piston bowl 26 and is connected by passages 37 forming transfer openings to the cooling channel 35.

Figure 7:
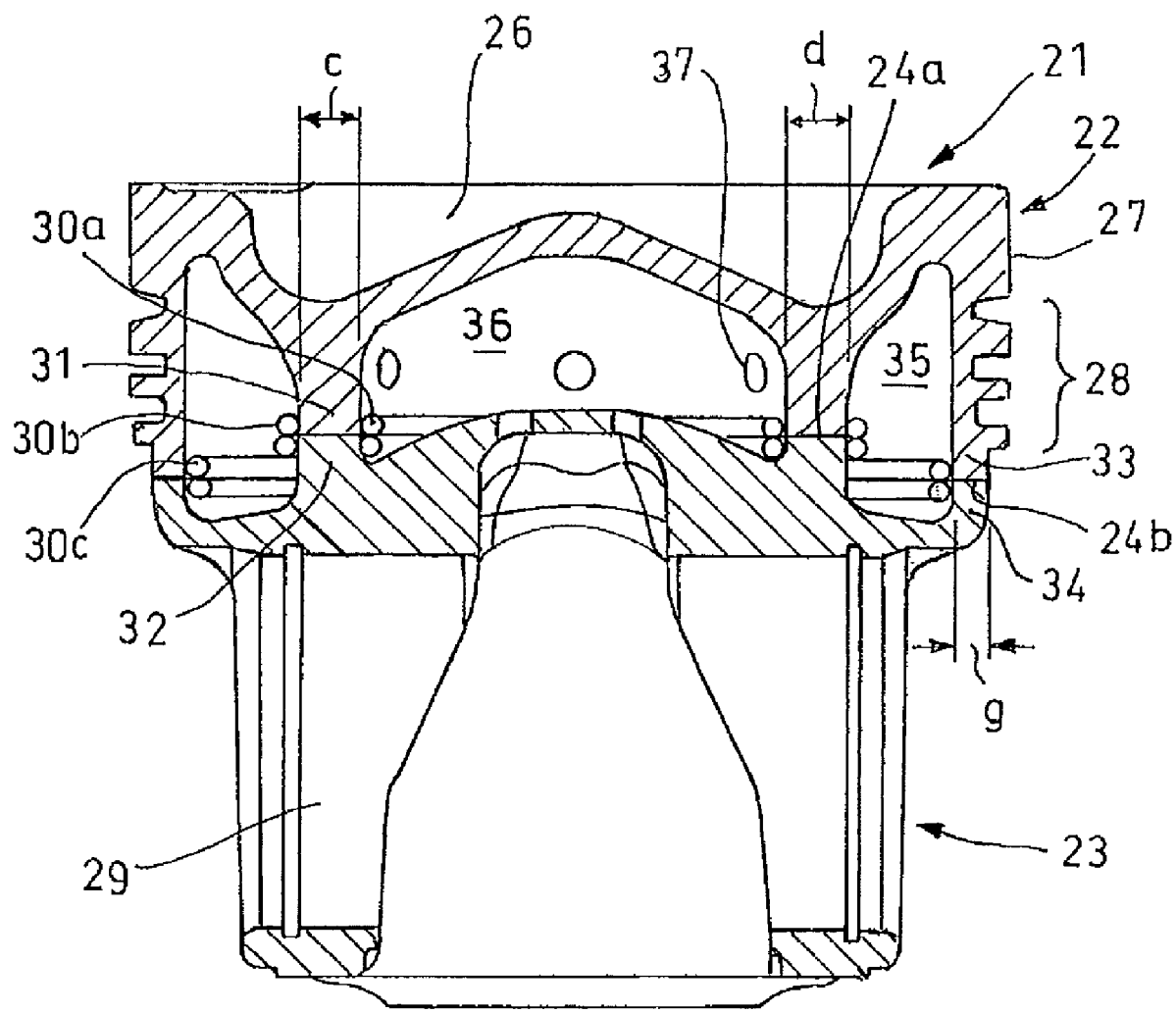
FIG. 7 shows the piston from FIG. 6 in a longitudinal section rotated about 90°.

FIG. 7 shows the piston 21 in a longitudinal section rotated by 90° to FIG. 6 and clarifies the design of the joining bosses 31, 32, 33, 34, where the wall thicknesses of sections "c, d" and "g" differ at least partly from the wall thicknesses of sections "a, b, e, f" in accordance with FIG. 6.

What is claimed is:

1. A method for producing a piston of an internal combustion engine, designed as a one-piece cooling channel piston comprising an upper part and a lower part that are supported by matching joining bosses together forming a joining zone and bonded by means of a friction weld, characterized in that multi-orbital friction welding is carried out to join the joining bosses of the piston that run rotationally asymmetrically.

2. A method for producing a piston of an internal combustion engine, designed as a one-piece cooling channel piston comprising an upper part and a lower part that are supported by matching joining bosses together forming a joining zone and bonded by means of a friction weld, characterized in that the piston comprises at least two joining zones spaced apart radially from each other and running one of rotationally asymmetrically whose joining bosses are joined by means of multi-orbital friction welding.

3. The method of claim 2 wherein a welding bead resulting after the friction weld is completed is left at the joining zones.

4. The method of claim 2 wherein a cooling channel of the piston is closed during the multi-orbital frictional welding process.

5. The method of claim 1, wherein the joining bosses have different wall thicknesses.

6. The method of claim 5 wherein the joining zone disposed circumferentially in the piston has a vertical offset "v".

7. The method claim 5 wherein a vertical offset is provided between two joining zones of the piston located radially offset to each other.

* * * * *